(12) United States Patent
Kamada et al.

(10) Patent No.: US 11,982,874 B2
(45) Date of Patent: May 14, 2024

(54) IMAGING LENS INCLUDING SIX LENSES OF +----+, +--+-+ OR +---+- REFRACTIVE POWERS

(71) Applicant: TOKYO VISIONARY OPTICS CO., LTD., Tokyo (JP)

(72) Inventors: Kenichi Kamada, Sukagawa (JP); Masaya Hashimoto, Sukagawa (JP)

(73) Assignee: TOKYO VISIONARY OPTICS Co., Ltd., Toyko (JP)

(*) Notice: Subject to any disclaimer, the term of this patent is extended or adjusted under 35 U.S.C. 154(b) by 0 days.

(21) Appl. No.: 17/391,748

(22) Filed: Aug. 2, 2021

(65) Prior Publication Data

US 2021/0356696 A1 Nov. 18, 2021

Related U.S. Application Data

(63) Continuation of application No. 16/843,597, filed on Apr. 8, 2020.

(30) Foreign Application Priority Data

Apr. 8, 2019 (JP) .................................. 2019-073279

(51) Int. Cl.
*G02B 13/00* (2006.01)
*G02B 9/62* (2006.01)
*G02B 3/04* (2006.01)

(52) U.S. Cl.
CPC ........... *G02B 9/62* (2013.01); *G02B 13/0045* (2013.01); *G02B 3/04* (2013.01)

(58) Field of Classification Search
CPC .............................. G02B 9/62; G02B 13/0045
See application file for complete search history.

(56) References Cited

U.S. PATENT DOCUMENTS 9,759,893 B2 9/2017 Jo

*Primary Examiner* — Wen Huang
(74) *Attorney, Agent, or Firm* — Maine Cernota & Curran

(57) ABSTRACT

There is provided an imaging lens with excellent optical characteristics which satisfies demand of low-profileness and low F-number. An imaging lens comprises, in order from an object side to an image side, a first lens with positive refractive power having an object-side surface being convex in a paraxial region, a second lens with negative refractive power in a paraxial region, a third lens with negative refractive power in a paraxial region, a fourth lens with positive or negative refractive power having an object-side surface being convex in a paraxial region, a fifth lens with positive or negative refractive power in a paraxial region, and a sixth lens with positive or negative refractive power having an image-side surface being convex in a paraxial region, and predetermined conditional expressions are satisfied.

7 Claims, 7 Drawing Sheets

IMAGING LENS INCLUDING SIX LENSES OF +----+, +--+-+ OR +---+- REFRACTIVE POWERS

The present application is based on and claims priority of a Japanese patent application No. 2019-073279 filed on Apr. 8, 2019, the entire contents of which are hereby incorporated by reference.

BACKGROUND OF THE INVENTION

Field of the Invention

The present invention relates to an imaging lens which forms an image of an object on a solid-state image sensor such as a CCD sensor or a C-MOS sensor used in an imaging device.

Description of the Related Art

In recent years, it becomes common that camera function is mounted in various products, such as information terminal equipment, home appliances, automobiles, and the like. Development of products with the camera function will be made accordingly.

The imaging lens mounted in such equipment is required to be compact and to have high-resolution performance.

As a conventional imaging lens aiming high performance, for example, the imaging lens disclosed in Patent Document 1 below have been known.

Patent Document 1 (U.S. Pat. No. 9,759,893B) discloses an imaging lens comprising, in order from an object side, a first lens, a second lens, a third lens, a fourth lens, a fifth lens and a sixth lens, and an image sensor for converting an optical image formed through the first lens to the sixth lens to an electric signal, a relationship between a total track length and a focal length of an overall optical system and a relationship between abbe numbers of the first lens and the third lens satisfy a certain condition.

SUMMARY OF THE INVENTION

However, in lens configurations disclosed in the Patent Document 1, when a low profile and a low F-number are to be realized, it is very difficult to correct aberrations at a peripheral area, and excellent optical performance can not be obtained.

The present invention has been made in view of the above-described problems, and an object of the present invention is to provide an imaging lens with high resolution which satisfies demand of the low profile and the low F-number in well balance and excellently corrects aberrations.

Regarding terms used in the present invention, "a convex surface", "a concave surface" or "a plane surface" of lens surfaces implies a shape of the lens surface in a paraxial region (near the optical axis). "Refractive power" implies the refractive power in a paraxial region. "A pole point" implies an off-axial point on an aspheric surface at which a tangential plane intersects the optical axis perpendicularly. "A total track length" is defined as a distance along the optical axis from an object-side surface of an optical element located closest to the object to an image plane. "The total track length" and "a back focus" is a distance obtained when thickness of an IR cut filter or a cover glass which may be arranged between the imaging lens and the image plane is converted into an air-converted distance.

An imaging lens according to the present invention comprises, in order from an object side to an image side, a first lens with positive refractive power having an object-side surface being convex in a paraxial region, a second lens with negative refractive power in a paraxial region, a third lens with negative refractive power in a paraxial region, a fourth lens with positive or negative refractive power having an object-side surface being convex in a paraxial region, a fifth lens with positive or negative refractive power in a paraxial region, and a sixth lens with positive or negative refractive power having an image-side surface being convex in a paraxial region.

According to the imaging lens having an above-described configuration, the first lens achieves reduction in a profile of the imaging lens by strengthening the refractive power. Furthermore, when the first lens has the object-side surface being convex in the paraxial region, spherical aberration and distortion are properly corrected.

The second lens properly corrects the spherical aberration and chromatic aberration.

The third lens properly corrects coma aberration, astigmatism and the distortion.

The fourth lens properly corrects the astigmatism and the distortion. Furthermore, when the fourth lens has the object-side surface being convex in the paraxial region, the astigmatism and the distortion can be more properly corrected.

The fifth lens properly corrects the astigmatism, field curvature and the distortion.

The sixth lens properly corrects the spherical aberration, the astigmatism, the field curvature and the distortion. Furthermore, when the sixth lens has the image-side surface being convex in the paraxial region, an incident angle of a light ray to an image sensor can be controlled. As a result, a radius of the sixth lens can be reduced, and the imaging lens having a small radius can be obtained.

According to the imaging lens having an above-described configuration, it is preferable that an object-side surface of the second lens is convex in the paraxial region.

When the object-side surface of the second lens is convex in the paraxial region, the coma aberration, the astigmatism and the distortion are properly corrected.

According to the imaging lens having an above-described configuration, it is preferable that an object-side surface of the third lens is convex in the paraxial region.

When the object-side surface of the third lens is convex in the paraxial region, the coma aberration and the astigmatism can be properly corrected.

According to the imaging lens having an above-described configuration, it is preferable that an object-side surface of the sixth lens is convex or concave in the paraxial region.

When the object-side surface of the sixth lens is convex or concave in the paraxial region, the spherical aberration can be properly corrected.

According to the imaging lens having the above-described configuration, it is preferable that the following conditional expression (1) is satisfied:

$$39.00 < vd3 < 73.00 \qquad (1)$$

where vd3: an abbe number at d-ray of the third lens.

The conditional expression (1) defines an appropriate range of the abbe number at d-ray of the third lens. By satisfying the conditional expression (1), chromatic aberration can be properly corrected.

According to the imaging lens having the above-described configuration, it is preferable that the following conditional expression (2) is satisfied:

$$11.00 < vd6 < 26.00 \tag{2}$$

where
vd6: an abbe number at d-ray of the sixth lens.

The conditional expression (2) defines an appropriate range of the abbe number at d-ray of the sixth lens. By satisfying the conditional expression (2), the chromatic aberration can be properly corrected.

According to the imaging lens having the above-described configuration, it is preferable that the following conditional expression (3) is satisfied:

$$-8.00 < |r11|/r12 \tag{3}$$

where
r11: a paraxial curvature radius of an object-side surface of the sixth lens, and
r12: a paraxial curvature radius of an image-side surface of the sixth lens.

The conditional expression (3) defines an appropriate range of a relationship between the paraxial curvature radii of the object-side surface and the image-side surface of the sixth lens. By satisfying the conditional expression (3), refractive powers of the object-side surface and the image-side surface of the sixth lens can be appropriately balanced. As a result, the astigmatism and the distortion can be properly corrected.

According to the imaging lens having the above-described configuration, it is preferable that the following conditional expression (4) is satisfied:

$$0.50 < r8/f < 10.00 \tag{4}$$

where
r8: a paraxial curvature radius of an image-side surface of the fourth lens, and
f: a focal length of the overall optical system of the imaging lens.

The conditional expression (4) defines an appropriate range of the paraxial curvature radius of an image-side surface of the fourth lens. By satisfying the conditional expression (4), the astigmatism and the distortion can be properly corrected.

According to the imaging lens having the above-described configuration, it is preferable that the following conditional expression (5) is satisfied:

$$0.70 < T45/T56 < 19.00 \tag{5}$$

where
T45: a distance along the optical axis from an image-side surface of the fourth lens to an object-side surface of the fifth lens, and
T56: a distance along the optical axis from an image-side surface of the fifth lens to an object-side surface of the sixth lens.

The conditional expression (5) defines an appropriate range of a relationship between the distance along the optical axis from an image-side surface of the fourth lens to an object-side surface of the fifth lens and the distance along the optical axis from an image-side surface of the fifth lens to an object-side surface of the sixth lens. By satisfying the conditional expression (5), the fifth lens is arranged at an optimum position, and aberration correction function of the lens becomes more effective. As a result, reduction in a profile can be achieved and the astigmatism and the distortion can be properly corrected.

According to the imaging lens having the above-described configuration, it is preferable that the following conditional expression (6) is satisfied:

$$11.00 < vd4 < 26.00 \tag{6}$$

where
vd4: an abbe number at d-ray of the fourth lens.

The conditional expression (6) defines an appropriate range of the abbe number at d-ray of the fourth lens. By satisfying the conditional expression (6), the chromatic aberration can be properly corrected.

According to the imaging lens having the above-described configuration, it is preferable that the following conditional expression (7) is satisfied:

$$0.90 < |f4|/f \tag{7}$$

where
f4: a focal length of the fourth lens, and
f: a focal length of the overall optical system of the imaging lens.

The conditional expression (7) defines an appropriate range of refractive power of the fourth lens. By satisfying the conditional expression (7), the astigmatism and the distortion can be properly corrected.

According to the imaging lens having the above-described configuration, it is preferable that the following conditional expression (8) is satisfied:

$$0.90 < |f6|/f \tag{8}$$

where
f6: a focal length of the sixth lens, and
f: a focal length of the overall optical system of the imaging lens.

The conditional expression (8) defines an appropriate range of refractive power of the sixth lens. By satisfying the conditional expression (8), the spherical aberration, the astigmatism, the field curvature and the distortion can be properly corrected.

According to the imaging lens having the above-described configuration, it is preferable that the following conditional expression (9) is satisfied:

$$-7.00 < f3/|f4| < -0.05 \tag{9}$$

where
f3: a focal length of the third lens, and
f4: a focal length of the fourth lens.

The conditional expression (9) defines an appropriate range of a relationship between the focal length of the third lens and the focal length of the fourth lens. By satisfying the conditional expression (9), refractive powers of the third lens and the fourth lens are prevented from being excessive. As a result, the coma aberration, the astigmatism and the distortion can be properly corrected.

According to the imaging lens having the above-described configuration, it is preferable that the following conditional expression (10) is satisfied:

$$-13.00 < f3/f < -0.90 \tag{10}$$

where
f3: a focal length of the third lens, and
f: a focal length of the overall optical system of the imaging lens.

The conditional expression (10) defines an appropriate range of refractive power of the third lens. When a value is below the upper limit of the conditional expression (10), negative refractive power of the third lens becomes appropriate and it is favorable for reducing the profile. On the other hand, when the value is above the lower limit of the conditional expression (10), the coma aberration, the astigmatism and the distortion can be properly corrected.

According to the imaging lens having the above-described configuration, it is preferable that the following conditional expression (11) is satisfied:

$$0.15 < r7/f < 13.00 \quad (11)$$

where
r7: a paraxial curvature radius of an object-side surface of the fourth lens, and
f: a focal length of the overall optical system of the imaging lens.

The conditional expression (11) defines an appropriate range of the paraxial curvature radius of an object-side surface of the fourth lens. When a value is below the upper limit of the conditional expression (11), the distortion can be properly corrected. On the other hand, when the value is above the lower limit of the conditional expression (11), the astigmatism can be properly corrected.

According to the imaging lens having the above-described configuration, it is preferable that the following conditional expression (12) is satisfied:

$$0.15 < |r11|/f < 20.00 \quad (12)$$

where
r11: a paraxial curvature radius of an object-side surface of the sixth lens, and
f: a focal length of the overall optical system of the imaging lens.

The conditional expression (12) defines an appropriate range of the paraxial curvature radius of an object-side surface of the sixth lens. By satisfying the conditional expression (12), the astigmatism and the distortion can be properly corrected.

According to the imaging lens having the above-described configuration, it is preferable that the following conditional expression (13) is satisfied:

$$0.10 < (D4/|f4|) \times 100 < 4.60 \quad (13)$$

where
D4: a thickness of the fourth lens along the optical axis, and
f4: a focal length of the fourth lens.

The conditional expression (13) defines an appropriate range of a relationship between the thickness of the fourth lens along the optical axis and the focal length of the fourth lens. When a value is below the upper limit of the conditional expression (13), refractive power of the fourth lens is prevented from being too large, and the astigmatism and the distortion can be properly corrected. Furthermore, the thickness of the fourth lens along the optical axis is also prevented from being too large, and it becomes favorable for reduction in the profile. On the other hand, when the value is above the lower limit of the conditional expression (13), the thickness of the fourth lens along the optical axis is prevented from being too small, and the formability of the lens becomes excellent.

According to the imaging lens having the above-described configuration, it is preferable that the following conditional expression (14) is satisfied:

$$1.00 < (D6/|f6|) \times 100 < 11.50 \quad (14)$$

where
D6: a thickness of the sixth lens along the optical axis, and
f6: a focal length of the sixth lens.

The conditional expression (14) defines an appropriate range of a relationship between the thickness of the sixth lens along the optical axis and the focal length of the sixth lens. When a value is below the upper limit of the conditional expression (14), refractive power of the sixth lens is prevented from being too large, and the spherical aberration, the astigmatism and the distortion can be properly corrected. Furthermore, the thickness of the sixth lens along the optical axis is also prevented from being too large, and it becomes facilitated to secure back focus. On the other hand, when the value is above the lower limit of the conditional expression (14), the thickness of the sixth lens along the optical axis is prevented from being too small, and the formability of the lens becomes excellent.

According to the imaging lens having the above-described configuration, it is preferable that the following conditional expression (15) is satisfied:

$$TTL/EPd \leq 2.40 \quad (15)$$

where
TTL: a total track length, and
EPd: an entrance pupil diameter.

The conditional expression (15) defines an appropriate range of a relationship between the total track length and the entrance pupil diameter. By satisfying the conditional expression (15), the total track length can be shortened, decrease in light quantity at the peripheral area can be suppressed and an image having sufficient brightness from a center to a peripheral area can be obtained.

Effect of Invention

According to the present invention, there can be provided an imaging lens with high resolution which satisfies demand of a low-profileness and a low F-number in well balance, and properly corrects aberrations.

DETAILED DESCRIPTION OF THE PREFERRED EMBODIMENT

Hereinafter, the preferred embodiments of the present invention will be described in detail referring to the accompanying drawings.

FIGS. 1, 3, 5, 7, 9 and 11 are schematic views of the imaging lenses in Examples 1 to 6 according to the embodiments of the present invention, respectively.

The imaging lens according to the present embodiment comprises, in order from an object side to an image side, a first lens L1 with positive refractive power having an object-side surface being convex in a paraxial region, a second lens L2 with negative refractive power in a paraxial region, a third lens L3 with negative refractive power in a paraxial region, a fourth lens L4 with positive or negative refractive power having an object-side surface being convex in a paraxial region, a fifth lens L5 with positive or negative refractive power in a paraxial region, and a sixth lens L6 with positive or negative refractive power having an image-side surface being convex in a paraxial region.

A filter IR such as an IR cut filter and a cover glass is arranged between the sixth lens L6 and an image plane IMG (namely, the image plane of an image sensor). The filter IR is omissible.

By arranging an aperture stop ST on the object side of the first lens L1, correction of aberrations and control of an incident angle of the light ray of high image height to an image sensor become facilitated.

The first lens L1 has the positive refractive power and is formed in a meniscus shape having an object-side surface being convex and an image-side surface being concave in a paraxial region (near the optical axis X). Therefore, spherical aberration and distortion can be properly corrected while achieving reduction in a profile.

Figure 3:
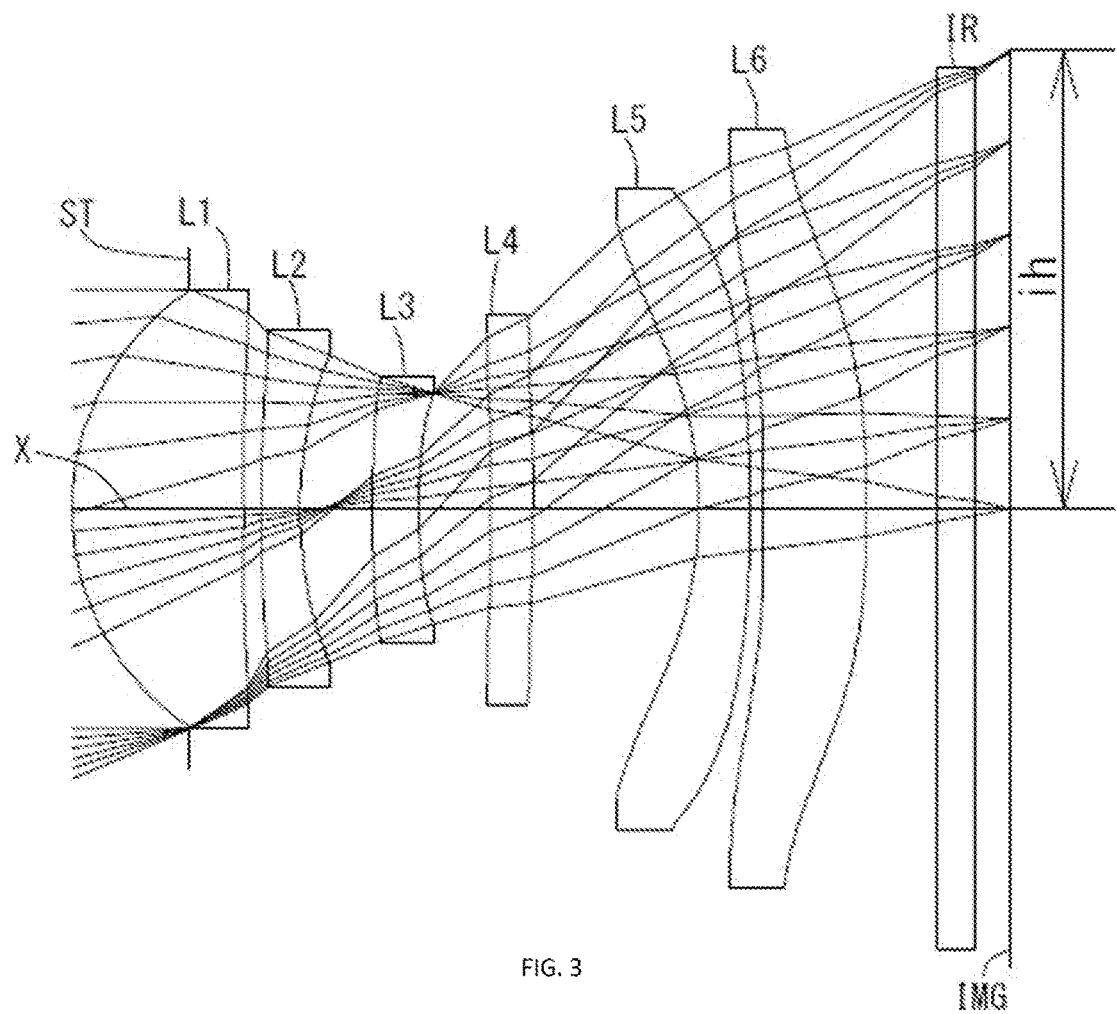
FIG. 3 is a schematic view showing an imaging lens in Example 2 according to the present invention.

The first lens L1 may be formed in a biconvex shape having the object-side surface being convex and the image-side surface being convex in a paraxial region (near the optical axis X) as in the Example 2 shown in FIG. 3. In this case, the positive refractive powers on both sides are favorable for reducing a profile. Furthermore, when the both-side surfaces are convex, a curvature is suppressed from being large, and sensitivity to a manufacturing error can be reduced.

The second lens L2 has negative refractive power and is formed in a meniscus shape having an object-side surface being convex and an image-side surface being concave in a paraxial region (near the optical axis X). Therefore, the spherical aberration, chromatic aberration, coma aberration, astigmatism and the distortion can be properly corrected.

The third lens L3 has negative refractive power and is formed in a meniscus shape having an object-side surface being convex and an image-side surface being concave in a paraxial region (near the optical axis X). Therefore, the coma aberration, the astigmatism and the distortion can be properly corrected.

The fourth lens L4 has negative refractive power and is formed in a meniscus shape having an object-side surface being convex and an image-side surface being concave in a paraxial region (near the optical axis X). Therefore, the astigmatism and the distortion can be properly corrected.

Refractive power of the fourth lens L4 may be positive as in the Example 2 shown in FIG. 3. In this case, the positive refractive power is favorable for reducing the profile.

The fifth lens L5 has negative refractive power and is formed in a biconcave shape having an object-side surface and an image-side surface being concave in a paraxial region (near the optical axis X).

The negative refractive powers on both sides are favorable for correcting the chromatic aberration, and the astigmatism, field curvature and the distortion can be properly corrected.

Figure 7:
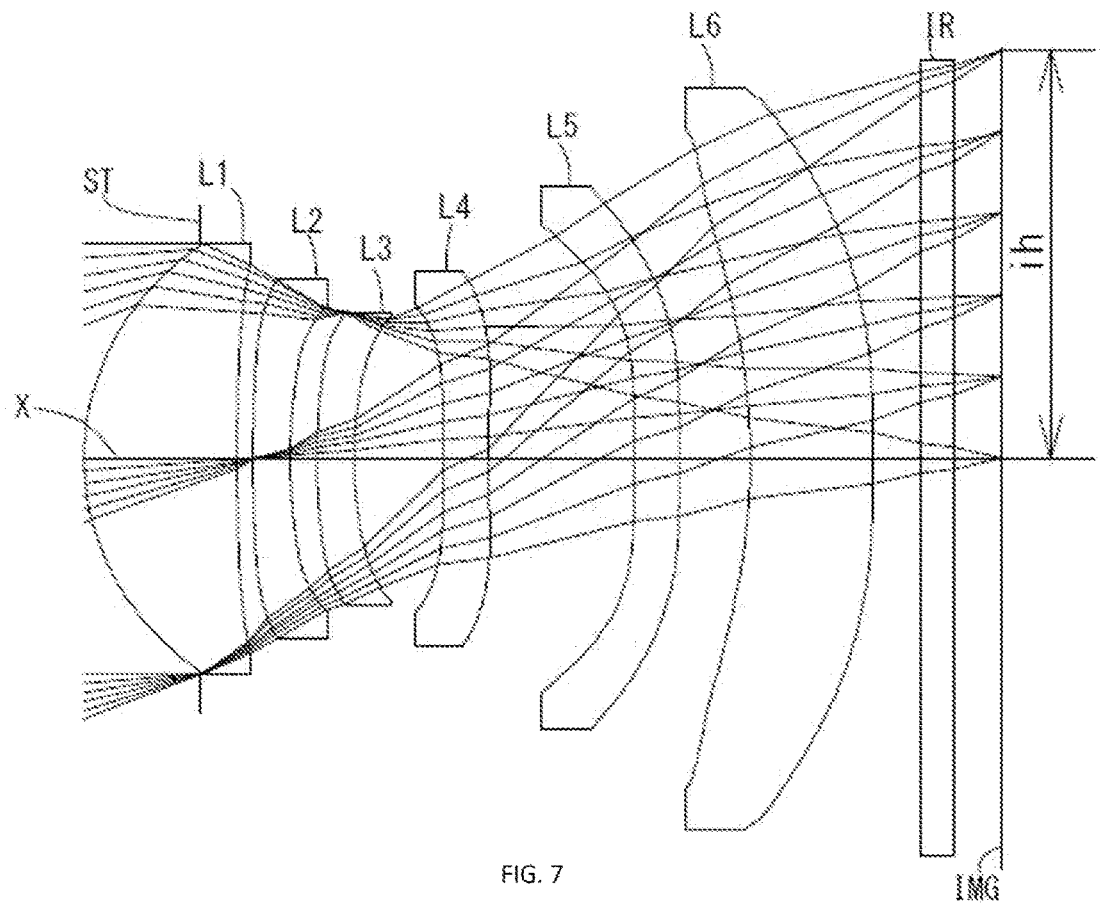
FIG. 7 is a schematic view showing an imaging lens in Example 4 according to the present invention.
Figure 11:
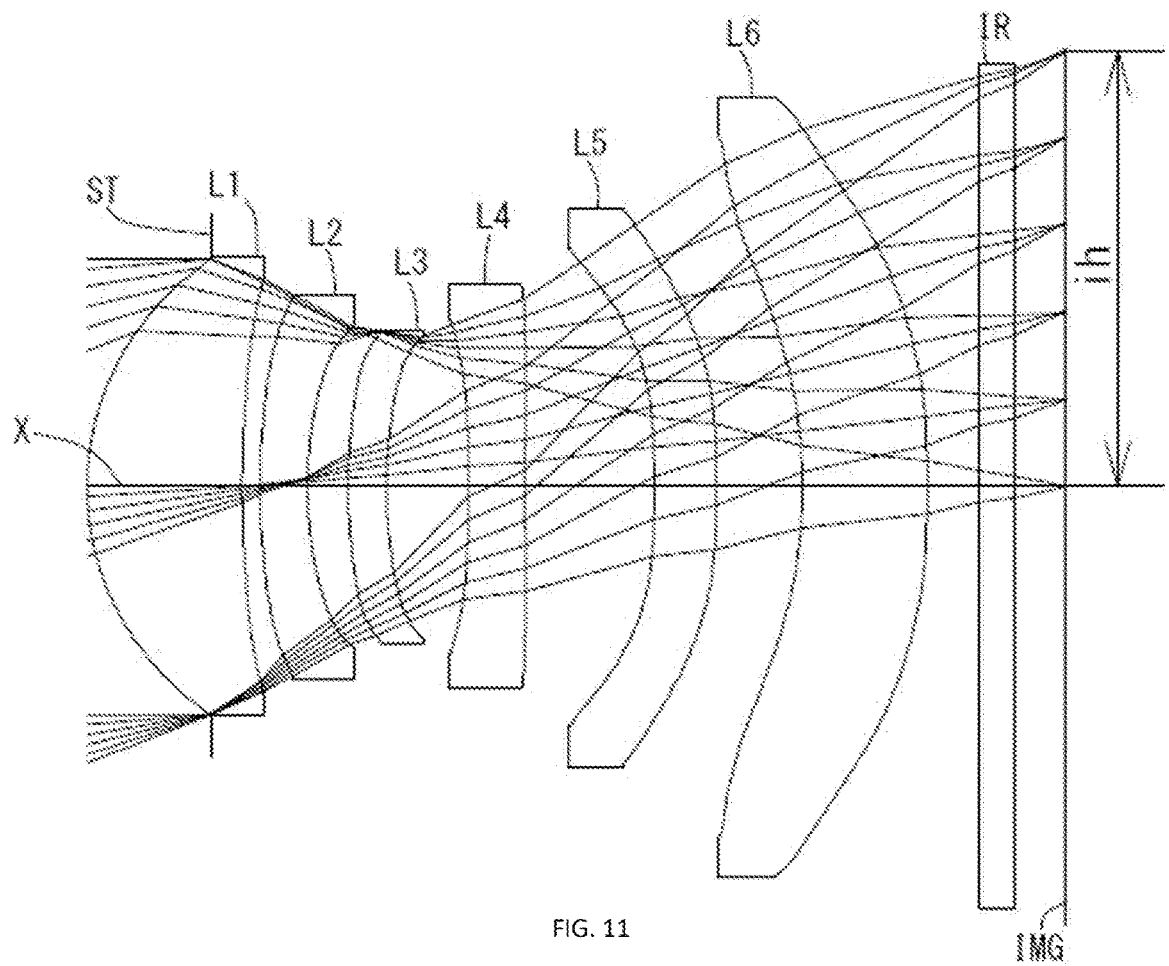
FIG. 11 is a schematic view showing an imaging lens in Example 6 according to the present invention.

Refractive power of the fifth lens L5 may be positive as in the Examples 4 and 6 shown in FIGS. 7 and 11. In this case, the positive refractive power is favorable for reducing the profile.

The fifth lens L5 may be formed in a meniscus shape having the object-side surface being concave and the image-side surface being convex in a paraxial region (near the optical axis X) as in the Examples 4 and 6 shown in FIGS. 7 and 11. In this case, an incident angle of a light ray to the image-side surface of the fifth lens L5 is appropriately controlled, and the distortion can be properly corrected.

The sixth lens L6 has positive refractive power and is formed in a biconvex shape having the object-side surface being convex and the image-side surface being convex in a paraxial region (near the optical axis X). Therefore, reduction in the profile is achieved, and the spherical aberration, the astigmatism, the field curvature and the distortion are properly corrected. Furthermore, when the image-side surface of the sixth lens L6 is convex in the paraxial region, an incident angle of a light ray to an image sensor can be controlled. As a result, a radius of the sixth lens L6 can be reduced, and the imaging lens having a small radius can be obtained.

Refractive power of the sixth lens L6 may be negative as in the Examples 4 and 6 shown in FIGS. 7 and 11. In this case, the negative refractive power is favorable for correcting the chromatic aberration.

Figure 5:
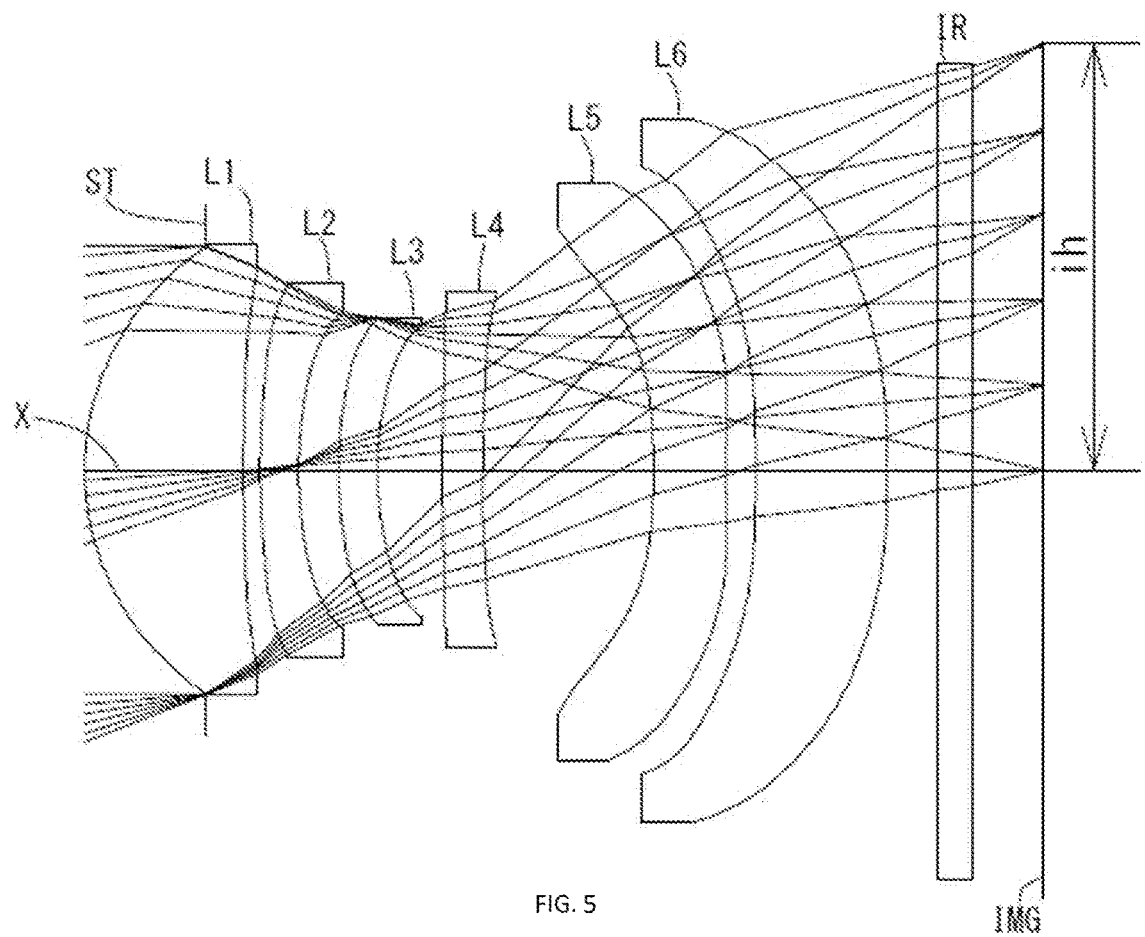
FIG. 5 is a schematic view showing an imaging lens in Example 3 according to the present invention.

The sixth lens L6 may be formed in a meniscus shape having the object-side surface being concave and the image-side surface being convex in a paraxial region (near the optical axis X) as in the Examples 3, 4 and 6 shown in FIGS. 5, 7 and 11. In this case, an incident angle of a light ray to the sixth lens L6 is appropriately controlled, and the distortion can be properly corrected.

Regarding the imaging lens according to the present embodiments, it is preferable that all lenses of the first lens L1 to the sixth lens L6 are single lenses. Configuration only with the single lenses can frequently use the aspheric surfaces. In the present embodiments, all lens surfaces are formed as appropriate aspheric surfaces, and the aberrations are favorably corrected. Furthermore, in comparison with a case in which a cemented lens is used, workload is reduced, and manufacturing in a low cost becomes possible.

Furthermore, the imaging lens according to the present embodiments makes manufacturing facilitated by using a plastic material for all of the lenses, and mass production in a low cost can be realized.

The material applied to the lens is not limited to the plastic material. By using glass material, further high performance may be aimed. It is preferable that all of lens-surfaces are formed as aspheric surfaces, however, spherical surfaces easy to be manufactured may be adopted in accordance with required performance.

The imaging lens according to the present embodiments shows preferable effect by satisfying the following conditional expressions (1) to (15).

$$39.00 < vd3 < 73.00 \tag{1}$$

$$11.00 < vd6 < 26.00 \tag{2}$$

$$-8.00 < |r11|/r12 \tag{3}$$

$$0.50 < r8/f < 10.00 \tag{4}$$

$$0.70 < T45/T56 < 19.00 \tag{5}$$

$$11.00 < vd4 < 26.00 \tag{6}$$

$$0.90 < |f4|/f \tag{7}$$

$$0.90 < |f6|/f \tag{8}$$

$$-7.00 < f3/|f4| < -0.05 \tag{9}$$

$$-13.00 < f3/f < -0.90 \tag{10}$$

$$0.15 < r7/f < 13.00 \tag{11}$$

$$0.15 < |r11|/f < 20.00 \tag{12}$$

$$0.10 < (D4/|f4|) \times 100 < 4.60 \tag{13}$$

$$1.00 < (D6/|f6|) \times 100 < 11.50 \tag{14}$$

$$TTL/EPD \, 52.40 \tag{15}$$

where
- vd3: an abbe number at d-ray of the third lens L3,
- vd4: an abbe number at d-ray of the fourth lens L4,
- vd6: an abbe number at d-ray of the sixth lens L6,
- D4: a thickness of the fourth lens L4 along the optical axis X,
- D6: a thickness of the sixth lens L6 along the optical axis X,
- T45: a distance along the optical axis X from an image-side surface of the fourth lens L4 to an object-side surface of the fifth lens L5,
- T56: a distance along the optical axis X from an image-side surface of the fifth lens L5 to an object-side surface of the sixth lens L6,
- TTL: a total track length,
- EPd: an entrance pupil diameter,
- f: a focal length of the overall optical system of the imaging lens,
- f3: a focal length of the third lens L3,
- f4: a focal length of the fourth lens L4,
- f6: a focal length of the sixth lens L6,
- r7: a paraxial curvature radius of an object-side surface of the fourth lens L4,
- r8: a paraxial curvature radius of an image-side surface of the fourth lens L4,
- r11: a paraxial curvature radius of an object-side surface of the sixth lens L6, and
- r12: a paraxial curvature radius of an image-side surface of the sixth lens L6.

It is not necessary to satisfy the above all conditional expressions, and by satisfying the conditional expression individually, operational advantage corresponding to each conditional expression can be obtained.

The imaging lens according to the present embodiments shows further preferable effect by satisfying the below conditional expressions (1a) to (15a).

$$47.00 < vd3 < 65.00 \tag{1a}$$

$$15.00 < vd6 < 22.50 \tag{2a}$$

$$-7.00 < |r11|/r12 < -0.05 \tag{3a}$$

$$0.60 < r8/f < 7.50 \tag{4a}$$

$$1.10 < T45/T56 < 17.00 \tag{5a}$$

$$15.00 < vd4 < 22.50 \tag{6a}$$

$$1.30 < |f4|/f < 24.00 \tag{7a}$$

$$1.20 < |f6|/f < 7.00 \tag{8a}$$

$$-5.50 < f3/|f4| < -0.10 \tag{9a}$$

$$-10.50 < f3/f < -1.35 \tag{10a}$$

$$0.50 < r7/f < 10.50 \tag{11a}$$

$$0.40 < |r1|/f < 14.00 \tag{12a}$$

$$0.15 < (D4/|f4|) \times 100 < 3.80 \tag{13a}$$

$$2.00 < (D6/|f6|) \times 100 < 9.50 \tag{14a}$$

$$TTL/EPD \, 2.30 \tag{15a}$$

The signs in the above conditional expressions have the same meanings as those in the paragraph before the preceding paragraph.

In this embodiment, the aspheric shapes of the aspheric surfaces of the lens are expressed by Equation 1, where Z denotes an axis in the optical axis direction, H denotes a height perpendicular to the optical axis, R denotes a paraxial curvature radius, k denotes a conic constant, and A4, A6, A8, A10, A12, A14, A16, A18 and A20 denote aspheric surface coefficients.

$$Z = \frac{\frac{H^2}{R}}{1 + \sqrt{1 - (k+1)\frac{H^2}{R^2}}} + A_4 H^4 + A_6 H^6 + A_8 H^8 + A_{10} H^{10} + A_{12} H^{12} + A_{14} H^{14} + A_{16} H^{16} + A_{18} H^{18} + A_{20} H^{20}$$ [Equation 1]

Next, examples of the imaging lens according to this embodiment will be explained. In each example, f denotes a focal length of the overall optical system of the imaging lens, Fno denotes an F-number, w denotes a half field of view, ih denotes a maximum image height, and TTL denotes a total track length. Additionally, i denotes a surface number counted from the object side, r denotes a paraxial curvature radius, d denotes a distance of lenses along the optical axis (surface distance), Nd denotes a refractive index at d-ray (reference wavelength), and vd denotes an abbe number at d-ray. As for aspheric surfaces, an asterisk (*) is added after surface number i.

Example 1

The basic lens data is shown below in Table 1.

TABLE 1

Example 1
Unit mm
f = 6.51
Fno = 2.40
ω(°) = 21.7
ih = 2.62
TTL = 5.63

Surface Data

| i | r | d | Nd | vd | |
|---|---|---|---|---|---|
| (Object) | Infinity | Infinity | | | |
| 1 (Stop) | Infinity | −0.7235 | | | |
| 2* | 1.5665 | 0.9940 | 1.544 | 55.86 | (vd1) |
| 3* | 16.5518 | 0.0200 | | | |
| 4* | 4.6910 | 0.2200 | 1.671 | 19.24 | (vd2) |
| 5* | 2.3188 | 0.3248 | | | |
| 6* | 2.4707 | 0.2400 | 1.535 | 55.66 | (vd3) |
| 7* | 1.7812 | 0.5223 | | | |
| 8* | 6.9102 | 0.2302 | 1.671 | 19.24 | (vd4) |
| 9* | 6.0219 | 1.2495 | | | |
| 10* | −4.3640 | 0.2800 | 1.544 | 55.86 | (vd5) |
| 11* | 5.6995 | 0.0807 | | | |
| 12* | 45.9776 | 0.7256 | 1.671 | 19.24 | (vd6) |
| 13* | −7.4763 | 0.4371 | | | |
| 14 | Infinity | 0.2100 | 1.517 | 64.20 | |
| 15 | Infinity | 0.1693 | | | |
| Image Plane | Infinity | | | | |

Constituent Lens Data

| Lens | Start Surface | Focal Length | Entrance Pupil Diameter | |
|---|---|---|---|---|
| 1 | 2 | 3.106 | EPd | 2.713 |
| 2 | 4 | −7.101 | | |
| 3 | 6 | −13.581 | | |
| 4 | 8 | −77.946 | | |
| 5 | 10 | 4.497 | | |
| 6 | 12 | 9.640 | | |

Aspheric Surface Data

| | First Surface | Second Surface | Third Surface | Fourth Surface | Fifth Surface | Sixth Surface |
|---|---|---|---|---|---|---|
| k | −5.135449E−02 | 4.410936E+00 | 0.000000E+00 | 0.000000E+00 | 0.000000E+00 | 0.000000E+00 |
| A4 | 3.403827E−03 | −7.184669E−02 | −1.576998E−01 | −1.347101E−01 | −2.045517E−01 | −2.093735E−01 |
| A6 | −4.401221E−03 | 1.655043E−01 | 3.030989E−01 | 3.184388E−01 | 4.341483E−01 | 4.669668E−01 |
| A8 | −7.807870E−03 | −1.339629E−01 | −2.563190E−01 | −2.579970E−01 | −3.801676E−01 | 4.850170E−01 |
| A10 | 5.703049E−02 | 5.400948E−02 | 2.244786E−01 | 2.485996E−01 | 6.695747E−01 | 8.741787E−01 |
| A12 | −1.199848E−01 | −1.030999E−02 | −1.846873E−01 | 1.442684E−01 | −9.288512E−01 | −1.024689E+00 |
| A14 | 1.286088E−01 | 0.000000E+00 | 9.496578E−02 | −4.640571E−01 | 6.725840E−01 | 5.290146E−01 |
| A16 | −7.838290E−02 | 0.000000E+00 | −2.021039E−02 | 2.882086E−01 | −1.767554E−01 | 0.000000E+00 |
| A18 | 2.557530E−02 | 0.000000E+00 | 0.000000E+00 | 0.000000E+00 | 0.000000E+00 | 0.000000E+00 |
| A20 | −3.523741E−03 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | −1.431657E+00 | 1.767794E+00 | 0.000000E+00 | 0.000000E+00 |
| A4 | −1.875210E−01 | −1.413374E−01 | −1.207832E−01 | −2.459690E−01 | −2.042253E−01 | −1.451645E−01 |
| A6 | 9.068205E−02 | 1.364915E−01 | −9.263461E−02 | 1.026576E−01 | 2.283406E−01 | 1.345807E−01 |
| A8 | 1.656073E−01 | −6.517175E−02 | 1.919158E−01 | −2.077217E−02 | −1.639831E−01 | −7.216864E−02 |
| A10 | −3.732572E−01 | 1.358012E−01 | −1.204918E−01 | 4.992323E−03 | 7.247253E−02 | 2.137832E−02 |
| A12 | 5.020200E−01 | −1.570465E−01 | 3.955468E−02 | −1.881070E−03 | −1.871574E−02 | −3.451163E−03 |
| A14 | 4.097846E−01 | 6.367952E−02 | −6.870642E−03 | 2.648595E−04 | 2.563573E−03 | 2.767508E−04 |
| A16 | 1.313165E−01 | −6.600000E−03 | 4.996816E−04 | 0.000000E+00 | −1.427158E−04 | 7.919825E−06 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 1 satisfies conditional expressions (1) to (15) as shown in Table 7.

Figure 1:
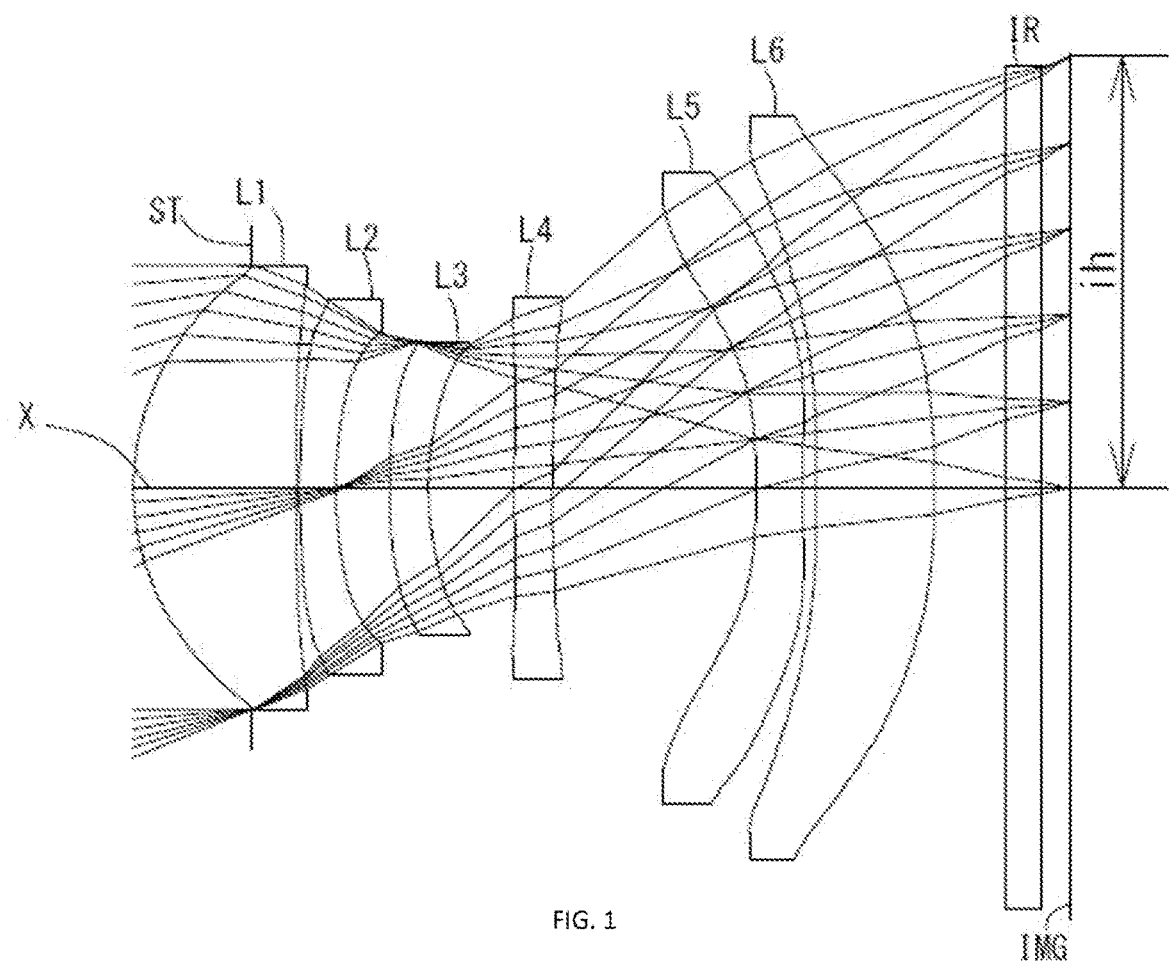
FIG. 1 is a schematic view showing an imaging lens in Example 1 according to the present invention.
Figure 2:
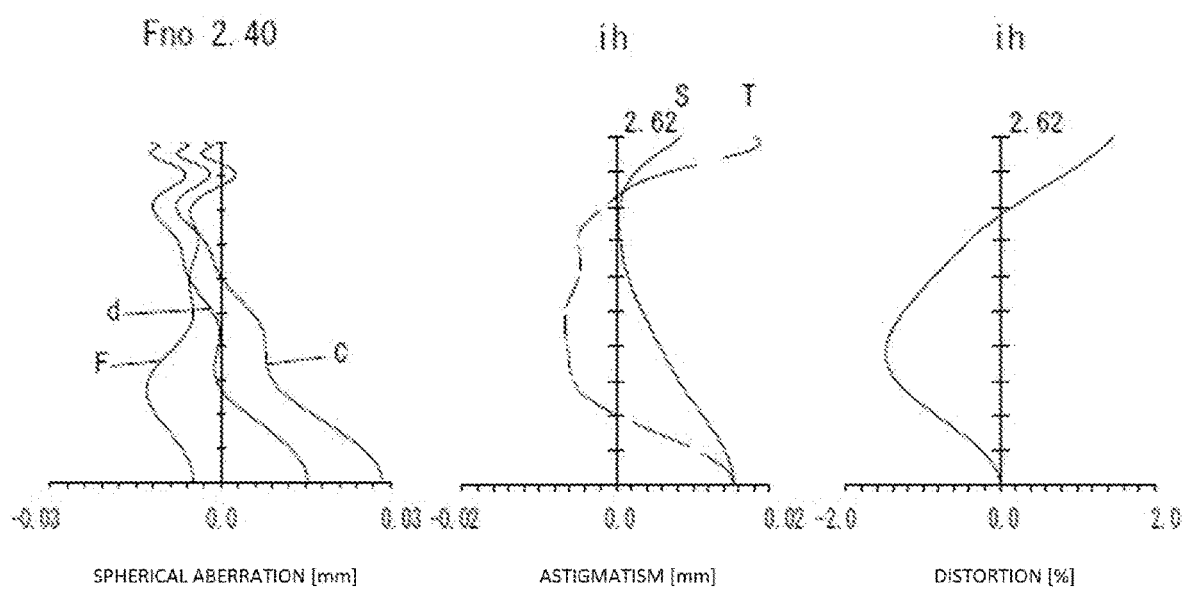
FIG. 2 shows spherical aberration, astigmatism, and distortion of the imaging lens in Example 1 according to the present invention.

FIG. 2 shows spherical aberration (mm), astigmatism (mm), and distortion (%) of the imaging lens in Example 1. The spherical aberration diagram shows the amount of aberration at each wavelength of F-ray (486 nm), d-ray (588 nm), and C-ray (656 nm). The astigmatism diagram shows the amount of aberration at d-ray on a sagittal image surface S (solid line) and on tangential image surface T (broken line), respectively (same as FIGS. 4, 6, 8, 10 and 12). As shown in FIG. 2, each aberration is corrected excellently.

Example 2

The basic lens data is shown below in Table 2.

TABLE 2

Example 2
Unit mm
f = 5.85
Fno = 2.40
ω(°) = 23.2
ih = 2.53
TTL = 5.13

Surface Data

| i | r | d | Nd | vd | |
|---|---|---|---|---|---|
| (Object) | Infinity | Infinity | | | |
| 1 (Stop) | Infinity | −0.6464 | | | |
| 2* | 1.4390 | 0.9523 | 1.544 | 56.44 | (vd1) |
| 3* | −66.4953 | 0.0941 | | | |
| 4* | 6.7690 | 0.2200 | 1.671 | 19.24 | (vd2) |
| 5* | 2.0972 | 0.3971 | | | |
| 6* | 4.8467 | 0.2576 | 1.535 | 55.69 | (vd3) |
| 7* | 2.5536 | 0.4000 | | | |
| 8* | 13.2882 | 0.2300 | 1.671 | 19.24 | (vd4) |
| 9* | 30.6600 | 0.9250 | | | |
| 10* | −2.4161 | 0.2800 | 1.544 | 56.44 | (vd5) |
| 11* | 33.6684 | 0.0800 | | | |
| 12* | 44.7310 | 0.5738 | 1.671 | 19.24 | (vd6) |
| 13* | −7.5852 | 0.3910 | | | |
| 14 | Infinity | 0.2100 | 1.517 | 64.20 | |
| 15 | Infinity | 0.1916 | | | |
| Image Plane | Infinity | | | | |

Contintuent Lens Data

| Lens | Start Surface | Focal Length | Entrance Pupil Diameter | |
|---|---|---|---|---|
| 1 | 2 | 2.600 | EPd | 2.439 |
| 2 | 4 | −4.617 | | |
| 3 | 6 | −10.503 | | |
| 4 | 8 | 34.780 | | |
| 5 | 10 | 4.129 | | |
| 6 | 12 | 9.712 | | |

Aspheric Surface Data

| | First Surface | Second Surface | Third Surface | Fourth Surface | Fifth Surface | Sixth Surface |
|---|---|---|---|---|---|---|
| k | −3.263512E−02 | 0.000000E+00 | 0.000000E+00 | 0.000000E+00 | 0.000000E+00 | 0.000000E+00 |
| A4 | −2.705287E−02 | 4.952865E−02 | −1.311782E−01 | −2.886808E−01 | −2.216541E−01 | −2.467413E−01 |
| A6 | 1.892406E−01 | −1.206645E−02 | 4.711064E−01 | 1.343067E+00 | 4.570970E−01 | 7.493984E−01 |
| A8 | −6.869981E−01 | −8.680598E−03 | −1.097981E+00 | 4.764969E+00 | 5.616529E−01 | 5.565305E−01 |
| A10 | 1.471266E+00 | 9.385371E−03 | 1.942503E+00 | 1.249802E+01 | −1.344480E+00 | 4.272065E+00 |
| A12 | −1.967517E+00 | −8.493308E−03 | −2.289580E+00 | −1.965729E+01 | −2.317895E+00 | 8.443212E+00 |
| A14 | 1.679591E+00 | 0.000000E+00 | 1.448880E+00 | 1.625508E+01 | 7.474126E+00 | −6.621345E+00 |
| A16 | −9.009629E−01 | 0.000000E+00 | −3.727997E−01 | −5.519180E+00 | −5.672409E+00 | 0.000000E+00 |
| A18 | 2.810924E−01 | 0.000000E+00 | 0.000000E+00 | 0.000000E+00 | 0.000000E+00 | 0.000000E+00 |
| A20 | −3.944211E−02 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −2.886778E−01 | −1.711464E−01 | −1.082328E−01 | −3.166605E−01 | −2.132166E−01 | −6.296086E−02 |
| A6 | 4.550239E−01 | 1.978238E−01 | 2.905934E−01 | 5.686361E−01 | 2.738677E−01 | 1.161304E−02 |
| A8 | −9.901431E−01 | −2.267033E−01 | 4.240165E−01 | −6.109176E−01 | −2.034696E−01 | 7.598435E−03 |
| A10 | 2.882524E+00 | 7.307963E−01 | 3.685409E−01 | 4.016054E−01 | 9.054178E−02 | −3.604536E−03 |
| A12 | 4.325491E+00 | −1.093417E+00 | −1.760215E−01 | −1.702164E−01 | −2.350501E−02 | 4.169417E−04 |
| A14 | 2.995349E+00 | 6.815102E−01 | 4.283737E−02 | 4.662665E−02 | 3.287491E−03 | 4.144102E−05 |
| A16 | −7.834575E−01 | −1.450000E−01 | 4.142002E−03 | −7.638767E−03 | −1.916200E−04 | −8.418534E−06 |
| A18 | 0.000000E+00 | 0.000000E+00 | 0.000000E+00 | 5.679980E−04 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 2 satisfies conditional expressions (1) to (15) as shown in Table 7.

Figure 4:
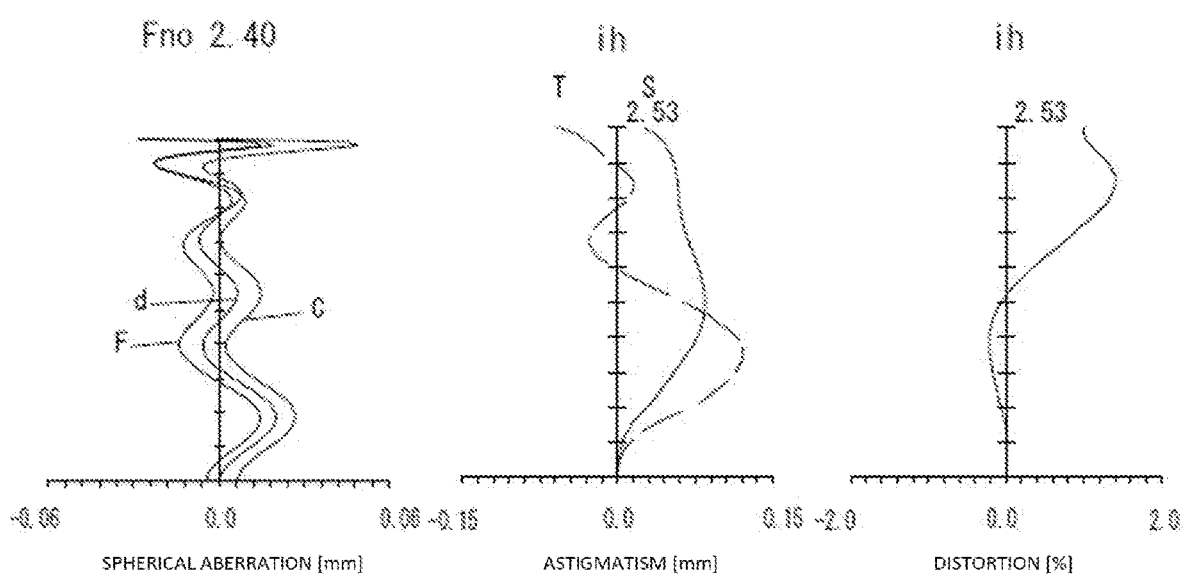
FIG. 4 shows spherical aberration, astigmatism, and distortion of the imaging lens in Example 2 according to the present invention.

FIG. 4 shows spherical aberration (mm), astigmatism (mm), and distortion (%) of the imaging lens in Example 2. As shown in FIG. 4, each aberration is corrected excellently.

Example 3

The basic lens data is shown below in Table 3.

TABLE 3

Example 3
Unit mm
f = 6.41
Fno = 2.40
ω(°) = 21.4
ih = 2.53
TTL = 5.63

Surface Data

| i | r | d | Nd | vd | |
|---|---|---|---|---|---|
| (Object) | Infinity | Infinity | | | |
| 1 (Stop) | Infinity | −0.7200 | | | |
| 2* | 1.5594 | 0.9399 | 1.544 | 56.44 | (vd1) |
| 3* | 9.5015 | 0.1000 | | | |
| 4* | 4.1572 | 0.2316 | 1.671 | 19.24 | (vd2) |
| 5* | 2.2767 | 0.2379 | | | |
| 6* | 2.2289 | 0.2300 | 1.535 | 55.69 | (vd3) |
| 7* | 1.7859 | 0.3855 | | | |
| 8* | 5.6485 | 0.2367 | 1.671 | 19.24 | (vd4) |
| 9* | 5.1270 | 1.0234 | | | |
| 10* | −4.4257 | 0.4279 | 1.544 | 56.44 | (vd5) |
| 11* | 7.8904 | 0.1762 | | | |
| 12* | 41.0473 | 0.7872 | 1.671 | 19.24 | (vd6) |
| 13* | −8.0869 | 0.3000 | | | |
| 14 | Infinity | 0.2100 | 1.517 | 64.20 | |
| 15 | Infinity | 0.4196 | | | |
| Image Plane | Infinity | | | | |

Constituent Lens Data

| Lens | Start Surface | Focal Length | Entrance Pupil Diameter | |
|---|---|---|---|---|
| 1 | 2 | 3.289 | EPd | 2.671 |
| 2 | 4 | −7.894 | | |
| 3 | 6 | −20.514 | | |
| 4 | 8 | −101.246 | | |
| 5 | 10 | −5.145 | | |
| 6 | 12 | 14.872 | | |

Aspheric Surface Data

| | First Surface | Second Surface | Third Surface | Fourth Surface | Fifth Surface | Sixth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.651960E−03 | −7.593647E−02 | −1.551401E−01 | −1.440891E−01 | −1.986046E−01 | −2.043804E−01 |
| A6 | −2.950736E−03 | 1.651540E−01 | 3.003166E−01 | 3.215576E−01 | 4.381340E−01 | 4.659481E−01 |
| A8 | −7.699943E−03 | −1.331599E−01 | −2.599963E−01 | −2.473941E−01 | −3.702487E−01 | −4.688938E−01 |
| A10 | 5.686038E−02 | 5.445559E−02 | 2.227525E−01 | 2.469582E−01 | 6.869018E−01 | 8.965790E−01 |
| A12 | −1.189907E−01 | −1.009514E−02 | −1.846289E−01 | 1.265948E−01 | −9.363964E−01 | −1.014689E+00 |
| A14 | 1.286085E−01 | −1.098315E−05 | 9.534670E−02 | −4.640146E−01 | 6.722758E−01 | 5.292458E−01 |
| A16 | −7.836718E−02 | 0.000000E+00 | −2.013244E−02 | 2.882078E−01 | −1.768910E−01 | 0.000000E+00 |
| A18 | 2.558840E−02 | 0.000000E+00 | 0.000000E+00 | 0.000000E+00 | 0.000000E+00 | 0.000000E+00 |
| A20 | −3.517552E−03 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | 6.719807E+00 | 0.000000E+00 | 0.000000E+00 | 0.000000E+00 |
| A4 | −1.954464E−01 | −1.412672E−01 | −1.231116E−01 | −2.339052E−01 | −2.125821E−01 | −1.472188E−01 |
| A6 | 1.041957E−01 | 1.415818E−01 | −1.007971E−01 | 8.811492E−02 | 2.232708E−01 | 1.326222E−01 |
| A8 | 1.848852E−01 | −5.632160E−0 | 1.907564E−01 | −1.884892E−02 | −1.640159E−01 | −7.257387E−02 |
| A10 | −3.755747E−01 | 1.395976E−01 | −1.229946E−01 | 5.976133E−03 | 7.347309E−02 | 2.123837E−02 |
| A12 | 4.954832E−01 | −1.589104E−01 | 4.081447E−02 | −2.009296E−03 | −1.871151E−02 | −3.440126E−03 |
| A14 | −4.096867E−01 | 6.266187E−02 | −5.297671E−03 | 1.574224E−04 | 2.509212E−03 | 3.232253E−04 |
| A16 | 1.313585E−01 | −3.000000E−03 | 0.000000E+00 | 0.000000E+00 | −1.570133E−04 | −1.809757E−05 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 3 satisfies conditional expressions (1) to (15) as shown in Table 7.

Figure 6:
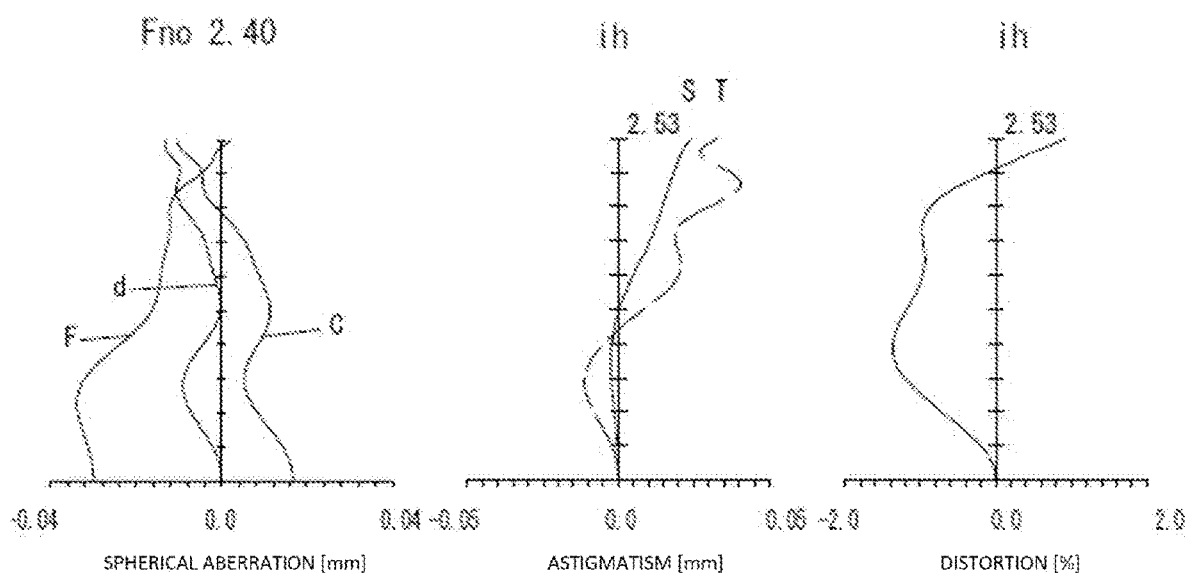
FIG. 6 shows spherical aberration, astigmatism, and distortion of the imaging lens in Example 3 according to the present invention.

FIG. 6 shows spherical aberration (mm), astigmatism (mm), and distortion (%) of the imaging lens in Example 3. As shown in FIG. 6, each aberration is corrected excellently.

Example 4

The basic lens data is shown below in Table 4.

TABLE 4

Example 4
Unit mm
f = 6.39
Fno = 2.40
ω(°) = 21.4
ih = 2.53
TTL = 5.63

Surface Data

| i | r | d | Nd | νd | |
|---|---|---|---|---|---|
| (Object) | Infinity | Infinity | | | |
| 1 (Stop) | Infinity | −0.7235 | | | |
| 2* | 1.5234 | 0.9500 | 1.544 | 56.44 | (vd1) |
| 3* | 9.0917 | 0.1000 | | | |
| 4* | 6.6247 | 0.2325 | 1.671 | 19.24 | (vd2) |
| 5* | 3.2920 | 0.1653 | | | |
| 6* | 3.4785 | 0.2301 | 1.544 | 56.44 | (vd3) |
| 7* | 2.2793 | 0.5482 | | | |
| 8* | 10.0261 | 0.2835 | 1.671 | 19.24 | (vd4) |
| 9* | 4.9761 | 0.9122 | | | |
| 10* | −23.3060 | 0.2800 | 1.544 | 56.44 | (vd5) |
| 11* | −22.3413 | 0.4326 | | | |
| 12* | −6.1631 | 0.7684 | 1.671 | 19.24 | (vd6) |
| 13* | −41.8433 | 0.3000 | | | |
| 14 | Infinity | 0.2100 | 1.517 | 64.20 | |
| 15 | Infinity | 0.2917 | | | |
| Image Plane | Infinity | | | | |

Constituent Lens Data

| Lens | Start Surface | Focal length | Entrance Pupil Diameter | |
|---|---|---|---|---|
| 1 | 2 | 3.219 | EPd | 2.662 |
| 2 | 4 | −10.037 | | |
| 3 | 6 | −13.025 | | |
| 4 | 8 | −15.069 | | |
| 5 | 10 | 899.307 | | |
| 6 | 12 | −10.869 | | |

Aspherical Surface Data

| | First Surface | Second Surface | Third Surface | Fourth Surface | Fifth Surface | Sixth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | 4.162754E−03 | −8.461474E−02 | −1.364579E−01 | −1.239030E−01 | −1.836930E−01 | −1.48128E−01 |
| A6 | −3.172347E−03 | 1.628242E−01 | 3.082265E−01 | 3.588088E−01 | 4.664157E−01 | 4.297239E−01 |
| A8 | −9.710188E−03 | −1.306093E−01 | −2.664580E−01 | −2.602189E−01 | −3.409163E−01 | −4.785962E−01 |
| A10 | 5.692781E−02 | 5.658974E−02 | 2.181506E−01 | 2.536105E−01 | 6.108286E−01 | 8.690622E−01 |
| A12 | −1.189706E−01 | −1.081805E−02 | −1.824324E−01 | 9.715532E−02 | −9.112863E−01 | −1.009613E+00 |
| A14 | 1.286284E−01 | 0.000000E+00 | 9.849473E−02 | −4.663495E−01 | 6.71 6081E−01 | 5.421910E−01 |
| A16 | −7.836356E−02 | 0.000000E+00 | −2.068218E−02 | 2.880876E−01 | −1.782000E−01 | 0.000000E+00 |
| A18 | 2.557782E−02 | 0.000000E+00 | 0.000000E+00 | 0.000000E+00 | 0.000000E+00 | 0.000000E+00 |
| A20 | −3.531485E−03 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.029018E−01 | −2.596021E−01 | −8.986413E−02 | −1.150732E−01 | −1.483334E−01 | −1.567276E−01 |
| A6 | 7.672187E−02 | 1.481134E−01 | −1.330805E−01 | 2.908682E−02 | 2.193718E−01 | 1.370119E−01 |
| A8 | 1.639508E−01 | −1.298118E−01 | 1.714056E−01 | −1.124422E−02 | −1.666100E−01 | −7.127599E−02 |
| A10 | −6.080072E−01 | 1.542469E−01 | −1.187573E−01 | 6.800575E−03 | 7.340746E−02 | 2.091203E−02 |
| A12 | 7.882610E−01 | −1.401444E−01 | 4.209082E−02 | −2.004369E−03 | −1.864798E−02 | −3.503749E−03 |
| A14 | −3.996477E−01 | 6.797618E−02 | −5.527614E−03 | 1.947010E−04 | 2.551220E−03 | 3.257759E−04 |
| A16 | 0.000000E+00 | −1.489579E−02 | 0.000000E+00 | 0.000000E+00 | −1.470530E−04 | −1.375513E−05 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 4 satisfies conditional expressions (1) to (15) as shown in Table 7.

Figure 8:
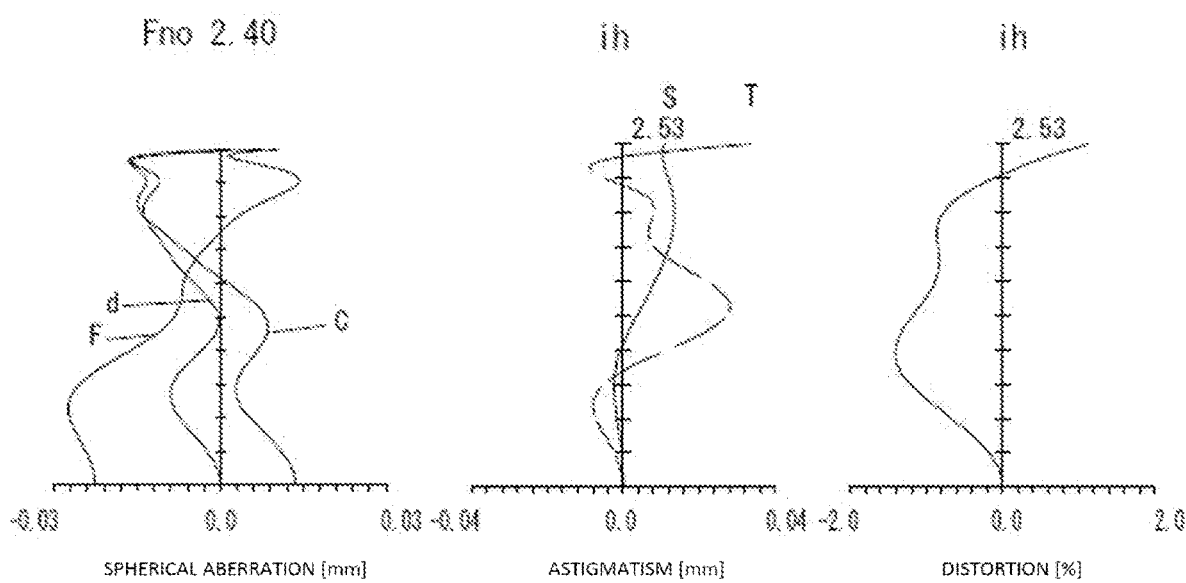
FIG. 8 shows spherical aberration, astigmatism, and distortion of the imaging lens in Example 4 according to the present invention.
Figure 9:
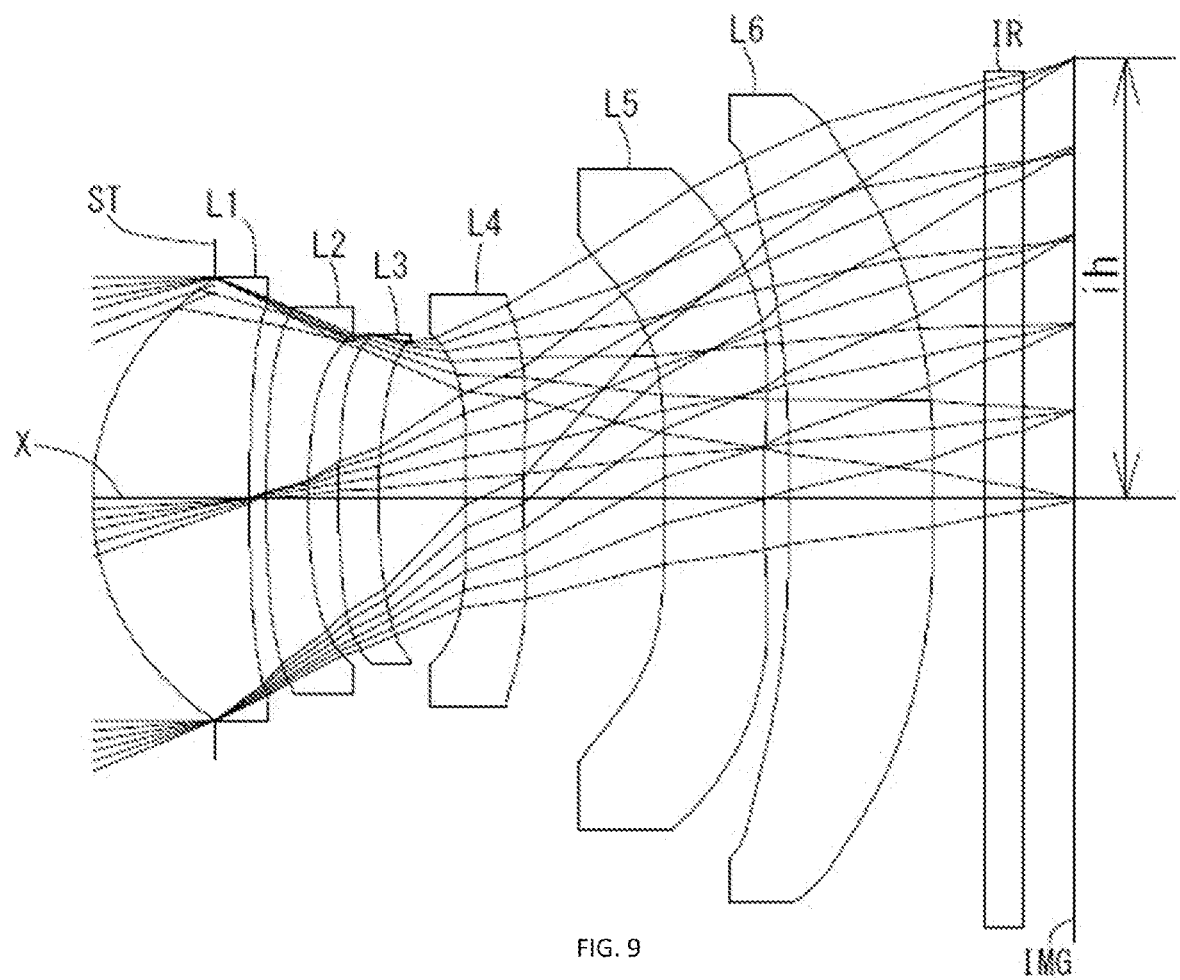
FIG. 9 is a schematic view showing an imaging lens in Example 5 according to the present invention.

FIG. 8 shows spherical aberration (mm), astigmatism (mm), and distortion (%) of the imaging lens in Example 4. As shown in FIG. 8, each aberration is corrected excellently.

Example 5

The basic lens data is shown below in Table 5.

TABLE 5

Example 5
Unit mm
f = 6.10
Fno = 2.40
ω(°) = 22.3
ih = 2.53
TTL = 5.58

Surface Data

| i | r | d | Nd | vd | |
|---|---|---|---|---|---|
| (Object) | Infinity | Infinity | | | |
| 1 (Stop) | Infinity | −0.7050 | | | |
| 2* | 1.4710 | 0.9000 | 1.544 | 56.44 | (vd1) |
| 3* | 7.1343 | 0.1000 | | | |
| 4* | 5.7698 | 0.2399 | 1.671 | 19.24 | (vd2) |
| 5* | 3.0037 | 0.1758 | | | |
| 6* | 3.8635 | 0.2300 | 1.544 | 56.44 | (vd3) |
| 7* | 2.9600 | 0.5040 | | | |
| 8* | 13.1003 | 0.3317 | 1.671 | 19.24 | (vd4) |
| 9* | 4.6288 | 0.8120 | | | |
| 10* | −55.3058 | 0.5711 | 1.544 | 56.44 | (vd5) |
| 11* | 5.1559 | 0.1431 | | | |
| 12* | 34.1405 | 0.8351 | 1.671 | 19.24 | (vd6) |
| 13* | −41.8433 | 0.3000 | | | |
| 14 | Infinity | 0.2100 | 1.517 | 64.20 | |
| 15 | Infinity | 0.3008 | | | |
| Image Plane | Infinity | | | | |

Constituent Lens Data

| Lens | Start Surface | Focal Length | Entrance Pupil Diameter | |
|---|---|---|---|---|
| 1 | 2 | 3.223 | EPd | 2.543 |
| 2 | 4 | −9.678 | | |
| 3 | 6 | −25.539 | | |
| 4 | 8 | −10.842 | | |
| 5 | 10 | −8.634 | | |
| 6 | 12 | 28.154 | | |

Aspherical Surface Data

| | First Surface | Second Surface | Third Surface | Fourth Surface | Fifth Surface | Sixth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.510971E−03 | −8.162220E−02 | −1.310565E−01 | −1.104593E−01 | −1.936100E−01 | −1.844149E−01 |
| A6 | −3.098583E−03 | 1.583853E−01 | 3.121309E−01 | 3.651381E−01 | 4.488107E−01 | 4.021621E−01 |
| A8 | −1.001336E−02 | −1.244311E−01 | −2.732058E−01 | −2.662586E−01 | −3.249550E−01 | −4.502394E−01 |
| A10 | 5.724775E−02 | 5.884668E−02 | 2.166646E−01 | 2.523136E−01 | 6.033487E−01 | 8.259315E−01 |
| A12 | −1.187950E−01 | −1.223370E−02 | −1.804361E−01 | 9.710475E−02 | −9.022028E−01 | −1.009613E+00 |
| A14 | 1.286680E−01 | 0.000000E+00 | 9.992042E−02 | −4.663530E−01 | 6.716081E−01 | 5.421910E−01 |
| A16 | −7.836749E−02 | 0.000000E+00 | −2.273865E−02 | 2.880876E−01 | −1.782000E−01 | 0.000000E+00 |
| A18 | 2.558368E−02 | 0.000000E+00 | 0.000000E+00 | 0.000000E+00 | 0.000000E+00 | 0.000000E+00 |
| A20 | −3.502257E−03 | 0.000000E+00 | 0.000000E+00 | 0.000000E+00 | 0.000000E+00 | 0.000000E+00 |

| | Seventh Surface | Eighth Surface | Ninth Surface | Tenth Surface | Eleventh Surface | Twelfth Surface |
|---|---|---|---|---|---|---|
| k | 0.000000E+00 | 0.000000E+00 | 0.000000E+00 | 0.000000E+00 | 0.000000E+00 | 0.000000E+00 |
| A4 | −3.174846E−01 | −2.619210E−01 | −7.298524E−02 | −1.332364E−01 | −1.721977E−01 | −1.567780E−01 |
| A6 | 5.252292E−02 | 1.617039E−01 | −1.370602E−01 | 4.652927E−02 | 2.183573E−01 | 1.385343E−01 |
| A8 | 2.192927E−01 | −1.323409E−01 | 1.769675E−01 | −2.275976E−02 | −1.659489E−01 | −7.149661E−02 |
| A10 | −6.648441E−01 | 1.630329E−01 | −1.191400E−01 | 8.415659E−03 | 7.342023E−02 | 2.087192E−02 |
| A12 | 7.882610E−01 | −1.427766E−01 | 4.169307E−02 | −1.599644E−03 | −1.865655E−02 | −3.502946E−03 |
| A14 | −3.996477E−01 | 6.311554E−02 | −5.515821E−03 | 1.125572E−04 | 2.550743E−03 | 3.268830E−04 |
| A16 | 0.000000E+00 | −1.050000E−02 | 0.000000E+00 | 0.000000E+00 | −1.470344E−04 | −1.377699E−05 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 5 satisfies conditional expressions (1) to (15) as shown in Table 7.

Figure 10:
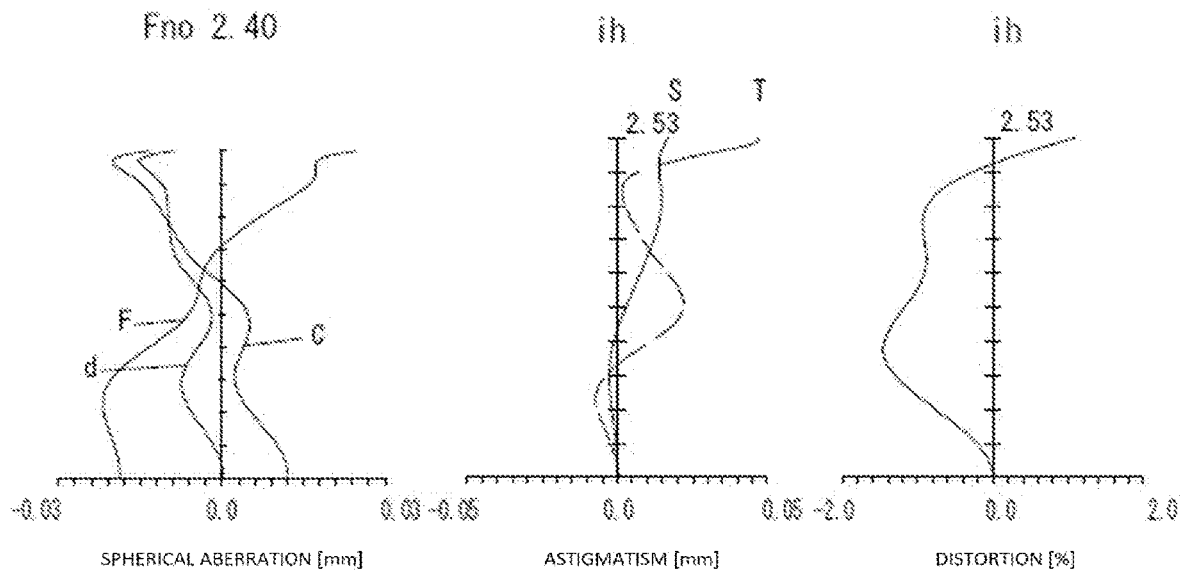
FIG. 10 shows spherical aberration, astigmatism, and distortion of the imaging lens in Example 5 according to the present invention.

FIG. 10 shows spherical aberration (mm), astigmatism (mm), and distortion (%) of the imaging lens in Example 5. As shown in FIG. 10, each aberration is corrected excellently.

Example 6

The basic lens data is shown below in Table 6.

TABLE 6

Example 6
Unit mm
f = 6.36
Fno = 2.40
ω(°) = 21.4
ih = 2.53
TTL = 5.61

| Surface Data | | | | | |
|---|---|---|---|---|---|
| i | r | d | Nd | νd | |
| (Object) | Infinity | Infinity | | | |
| 1 (Stop) | Infinity | −0.7150 | | | |
| 2* | 1.5434 | 0.9000 | 1.544 | 56.44 | (vd1) |
| 3* | 6.2338 | 0.1000 | | | |
| 4* | 3.3994 | 0.2809 | 1.671 | 19.24 | (vd2) |
| 5* | 2.2029 | 0.2359 | | | |
| 6* | 2.8808 | 0.2231 | 1.535 | 55.69 | (vd3) |
| 7* | 2.5460 | 0.4718 | | | |
| 8* | 54.5797 | 0.3269 | 1.671 | 19.24 | (vd4) |
| 9* | 7.0367 | 0.7597 | | | |
| 10* | −6.7988 | 0.3596 | 1.544 | 56.44 | (vd5) |
| 11* | −6.8400 | 0.4952 | | | |
| 12* | −4.0283 | 0.7298 | 1.671 | 19.24 | (vd6) |
| 13* | −9.3085 | 0.3000 | | | |
| 14 | Infinity | 0.2100 | 1.517 | 64.20 | |
| 15 | Infinity | 0.2923 | | | |
| Image Plane | Infinity | | | | |

| Constituent Lens Data | | | | |
|---|---|---|---|---|
| Lens | Start Surface | Focal Length | Entrance Pupil Diameter | |
| 1 | 2 | 3.529 | EPd | 2.649 |
| 2 | 4 | −10.301 | | |
| 3 | 6 | −53.347 | | |
| 4 | 8 | −12.077 | | |
| 5 | 10 | 997.695 | | |
| 6 | 12 | −11.210 | | |

| Aspheric Surface Data | | | | | |
|---|---|---|---|---|---|
| | First Surface | Second Surface | Third Surface | Fourth Surface | Fifth Surface | Sixth Surface |
| k | 0.000000E+00 | 0.000000E+00 | 0.000000E+00 | 0.000000E+00 | 0.000000E+00 | 0.000000E+00 |
| A4 | −2.793646E−03 | −8.299577E−02 | −1.503894E−01 | −1.389800E−01 | −2.075478E−01 | −1.879524E−01 |
| A6 | −4.118851E−03 | 1.644166E−01 | 2.993562E−01 | 3.244132E−01 | 4.480627E−01 | 4.526219E−01 |
| A8 | −8.563318E−03 | −1.306871E−01 | −2.644296E−01 | −2.470765E−01 | −3.381966E−01 | −4.638907E−01 |
| A10 | 5.694947E−02 | 5.549650E−02 | 2.227004E−01 | 2.416856E−01 | 6.659065E−01 | 9.124495E−01 |
| A12 | −1.188986E−01 | −1.011684E−02 | −1.834858E−01 | 1.150877E−01 | −9.340943E−01 | −1.014456E+00 |
| A14 | 1.286618E−01 | −3.730133E−04 | 9.621275E−02 | −4.640245E−01 | 6.723186E−01 | 5.292426E−01 |
| A16 | −7.835213E−02 | 0.000000E+00 | −2.064864E−02 | 2.882045E−01 | −1.768901E−01 | 0.000000E+00 |
| A18 | 2.558644E−02 | 0.000000E+00 | 0.000000E+00 | 0.000000E+00 | 0.000000E+00 | 0.000000E+00 |
| A20 | −3.523194E−03 | 0.000000E+00 | 0.000000E+00 | 0.000000E+00 | 0.000000E+00 | 0.000000E+00 |
| | Seventh Surface | Eighth Surface | Ninth Surface | Tenth Surface | Eleventh Surface | Twelfth Surface |
| k | 0.000000E+00 | 0.000000E+00 | 0.000000E+00 | 0.000000E+00 | 0.000000E+00 | 0.000000E+00 |
| A4 | −2.213987E−01 | −1.726630E−01 | −1.31 626E−01 | −1.506490E−01 | −1.660401E−01 | −1.612103E−01 |
| A6 | 7.863225E−02 | 1.378595E−01 | −9.247069E−02 | 6.197851E−02 | 2.254995E−01 | 1.396865E−01 |
| A8 | 1.787112E−01 | −7.837902E−02 | 1.794070E−01 | −1.408175E−02 | −1.658847E−01 | −7.193663E−02 |
| A10 | −3.816772E−01 | 1.354788E−01 | −1.238765E−01 | 5.395628E−03 | 7.332226E−02 | 2.095595E−02 |
| A12 | 4.958827E−01 | −1.522981E−01 | 4.128844E−02 | −2.049950E−03 | −1.868087E−02 | −3.486947E−03 |
| A14 | −4.097148E−01 | 6.809195E−02 | −5.087646E−03 | 2.690727E−04 | 2.541790E−03 | 3.272403E−04 |
| A16 | 1.313597E−01 | −1.056419E−02 | 0.000000E+00 | 0.000000E+00 | −1.443350E−04 | −1.440534E−05 |
| A18 | 0.000000E+00 | 0.000000E+00 | 0.000000E+00 | 0.000000E+00 | 0.000000E+00 | 0.000000E+00 |
| A20 | 0.000000E+00 | 0.000000E+00 | 0.000000E+00 | 0.000000E+00 | 0.000000E+00 | 0.000000E+00 |

The imaging lens in Example 6 satisfies conditional expressions (1) to (15) as shown in Table 7.

Figure 12:
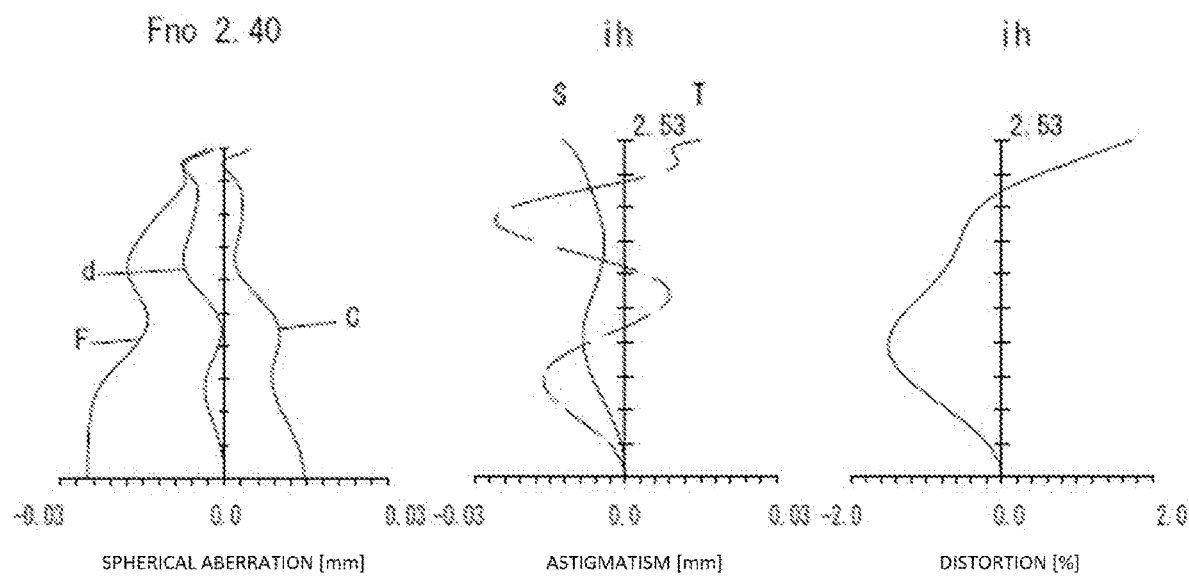
FIG. 12 shows spherical aberration, astigmatism, and distortion of the imaging lens in Example 6 according to the present invention.

FIG. 12 shows spherical aberration (mm), astigmatism (mm), and distortion (%) of the imaging lens in Example 6. As shown in FIG. 12, each aberration is corrected excellently.

In table 7, values of conditional expressions (1) to (15) related to the Examples 1 to 6 are shown.

TABLE 7

| Conditional Expressions | Example 1 | Example 2 | Example 3 | Example 4 | Example 5 | Example 6 |
|---|---|---|---|---|---|---|
| (1) vd3 | 55.66 | 55.69 | 55.69 | 56.44 | 56.44 | 55.69 |
| (2) vd6 | 19.24 | 19.24 | 19.24 | 19.24 | 19.24 | 19.24 |
| (3) |r11|/r12 | −6.15 | −5.90 | −5.08 | −0.15 | −0.82 | −0.43 |
| (4) r8/f | 0.92 | 5.24 | 0.80 | 0.78 | 0.76 | 1.11 |
| (5) T4/T5 | 15.49 | 11.56 | 5.81 | 2.11 | 5.68 | 1.53 |
| (6) vd 4 | 19.24 | 19.24 | 19.24 | 19.24 | 19.24 | 19.24 |
| (7) |f4|/f | 11.97 | 5.94 | 15.79 | 2.36 | 1.78 | 1.90 |
| (8) |f6|/f | 1.48 | 1.66 | 2.32 | 1.70 | 4.61 | 1.76 |
| (9) f3/|f4| | −0.17 | −0.30 | −0.20 | −0.86 | −2.36 | −4.42 |
| (10) f3/f | −2.09 | −1.79 | −3.20 | −2.04 | −4.19 | −8.39 |
| (11) r7/f | 1.06 | 2.27 | 0.88 | 1.57 | 2.15 | 8.58 |
| (12) |r11|/f | 7.06 | 7.64 | 6.40 | 0.96 | 5.59 | 0.63 |
| (13) (D4/|f4|) × 100 | 0.30 | 0.66 | 0.23 | 1.88 | 3.06 | 2.71 |
| (14) (D6/|f6|) × 100 | 7.53 | 5.91 | 5.29 | 7.07 | 2.97 | 6.51 |
| (15) TTL/EPd | 2.08 | 2.10 | 2.11 | 2.12 | 2.20 | 2.12 |

When the imaging lens according to the present invention is adopted to a product with the camera function, there is realized contribution to low-profileness and low F-number of the camera and also high performance thereof.

DESCRIPTION OF REFERENCE NUMERALS

ST: aperture stop
L1: first lens
L2: second lens
L3: third lens
L4: fourth lens
L5: fifth lens
L6: sixth lens
ih: maximum image height
IR: filter
IMG: imaging plane

What is claimed is:

1. An imaging lens comprising in order from an object side to an image side,
a first lens with positive refractive power having an object-side surface being convex in a paraxial region,
a second lens with negative refractive power in a paraxial region, a third lens with negative refractive power in a paraxial region,
a fourth lens with positive or negative refractive power having an object-side surface being convex in a paraxial region,
a fifth lens with positive or negative refractive power in a paraxial region, and
a sixth lens with positive or negative refractive power having an image-side surface being convex in a paraxial region,
wherein an object-side surface of said fifth lens is concave in the paraxial region, the imaging lens has only six lenses with refractive power, and the following conditional expressions (1), (2) (3) and (10a) are satisfied:

$$39.00 < vd3 < 73.00 \quad (1)$$

$$11.00 < vd6 < 26.00 \quad (2)$$

$$-8.00 < |r11|/r12 \quad (3)$$

$$-10.50 < f3/f < -1.35 \quad (10a)$$

where
vd3: an abbe number at d-ray of the third lens,
vd6: an abbe number at d-ray of the sixth lens,
r11: a paraxial curvature radius of an object-side surface of the sixth lens,
r12: a paraxial curvature radius of an image-side surface of the sixth lens,
f3: a focal length of the third lens, and
f: a focal length of the overall optical system of the imaging lens.

2. The imaging lens according to claim 1, wherein an object-side surface of said second lens is convex in the paraxial region.

3. The imaging lens according to claim 1, wherein the following conditional expression (4) is satisfied:

$$0.50 < r8/f < 10.00 \quad (4)$$

where
r8: a paraxial curvature radius of an image-side surface of the fourth lens.

4. The imaging lens according to claim 1, wherein the following conditional expression (5) is satisfied:

$$0.70 < T45/T56 < 19.00 \quad (5)$$

where
T45: a distance along an optical axis from an image-side surface of the fourth lens to an object-side surface of the fifth lens, and
T56: a distance along an optical axis from an image-side surface of the fifth lens to an object-side surface of the sixth lens.

5. The imaging lens according to claim 1, wherein the following conditional expression (6) is satisfied:

$$11.00 < vd4 < 26.00 \quad (6)$$

where
vd4: an abbe number at d-ray of the fourth lens.

6. The imaging lens according to claim 1, wherein the following conditional expression (7) is satisfied:

$$0.90 < |f4|/f \text{ where} \quad (7)$$

f4: a focal length of the fourth lens.

7. The imaging lens according to claim 1, wherein the following conditional expression (8) is satisfied:

$$0.90 < |f6|/f \quad \text{where} \tag{8}$$

f6: a focal length of the sixth lens.

\* \* \* \* \*